INVENTOR.
DOUGLAS H. TAYLOR

INVENTOR.
DOUGLAS H. TAYLOR
BY Bruno and Jenney
Att'ys.

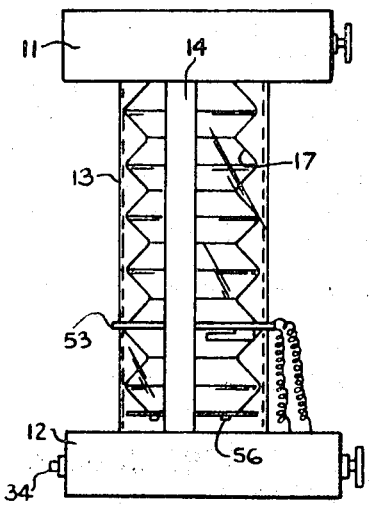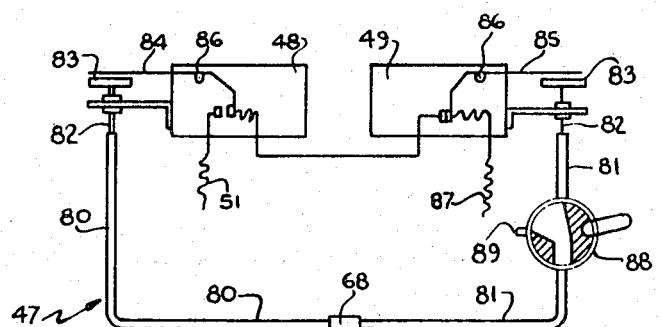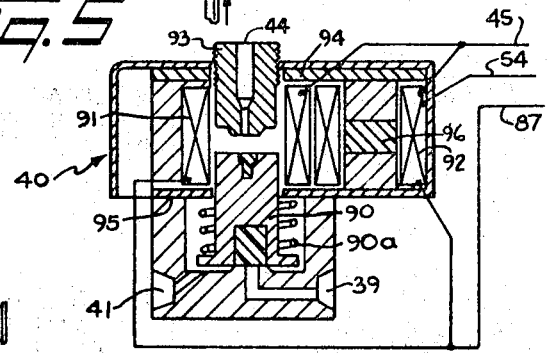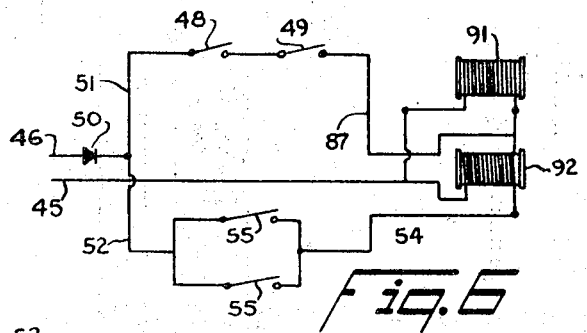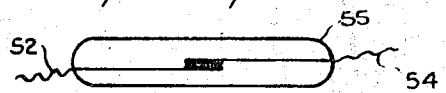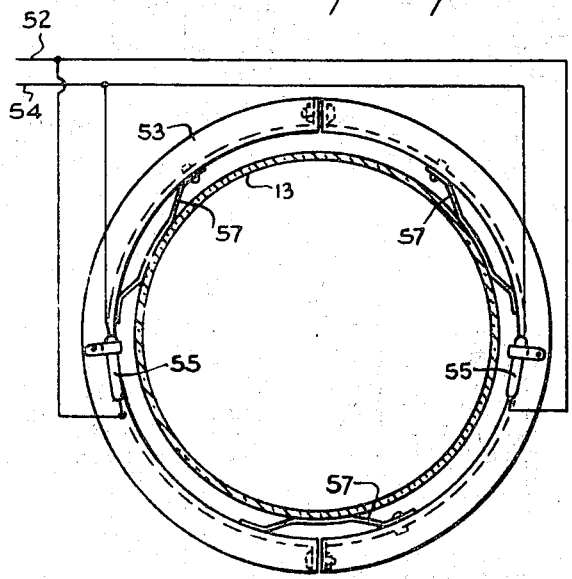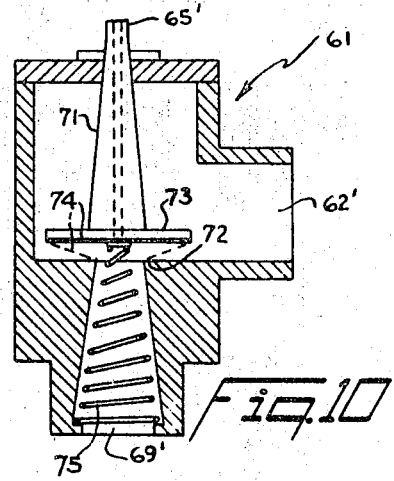
INVENTOR.
DOUGLAS H. TAYLOR United States Patent Office 3,515,134
Patented June 2, 1970

3,515,134
VOLUMETRIC CONTROL DEVICE FOR POSITIVE
PRESSURE BREATHING MACHINES
Douglas H. Taylor, Jamesville, N.Y., assignor of fifty
percent to John R. Potrafka, Syracuse, N.Y.
Filed Dec. 28, 1967, Ser. No. 694,283
Int. Cl. A62b 7/00
U.S. Cl. 128—145.6                                  6 Claims

ABSTRACT OF THE DISCLOSURE

The device powered by an intermittent positive pressure breathing machine has a transparent hollow cylinder in which is suspended a bellows, the cylinder and bellows each being sealed at both ends except for separate passages leading to the bellows interior and cylinder interior. A pressure operated switch operates a valve arrangement to admit gas from the machine to the cylinder upon the machine-initiated inspiration half-cycle and a magnetically operated switch adjustably mounted on the cylinder initiates the expiration half-cycle, the bellows bottom carrying a cooperating magnet. During inspiration the bellows force gas to the patient and during expiration gas is forced from the cylinder to the bellows through the passages.

BACKGROUND OF THE INVENTION

This invention relates to respirator machines and more particularly to a volumetric control device for positive pressure breathing machines.

In the respirator field, intermittent positive pressure breathing machines for breathing assistance can be obtained at reasonable cost. These machines supply a mixture of air and oxygen, or pure oxygen, at a low pressure to the patient during an inspiration portion of the cycle. The supplying of gas is ended by an automatically cycling control in the machine or by an increase of pressure in the apparatus induced by patient resistance, whichever comes first. At this point an exhalation valve, located near the patient is automatically opened so that the patient's exhalation is exhausted through the valve during the expiration portion of the cycle.

The expiration half-cycle, longer than the other half-cycle, is ended by the automatic cycling control or by minus-pressure in the apparatus induced by patient effort to inhale, whichever comes first. At this point the exhalation valve is automatically closed and gas under pressure is again supplied for another inspiration half-cycle Since the inspiration portion of the cycle is time-limited or pressure-limited, there is no control over the amount of gas supplied to the patient for each breath.

In treating many patients it is desirable that each inspiration half-cycle be controlled, in part at least, by a volume-limiting means to supply a measured amount of gas at each inspiration. There are breathing machines which have volume control, usually measured by a spirometer device, but these machines are expensive, costing about ten times the price of positive pressure machines, and are large and cumbersome so as to be not easily moved about.

SUMMARY OF THE INVENTION

The present invention contemplates an economically made and portable device which can be used with a positive pressure machine to obtain volumetric control of the amount of gas supplied by the machine during each cycle. The device comprises in part a transparent hollow cylinder in which is suspended a rubber bellows, both cylinder and bellows being sealed closed at top and bottom except for a passage leading to the bellows interior at the top and one leading to the cylinder interior at the bottom.

Valves, including an electromagnetically operated pneumatic valve, control the supply or gas under pressure from the breathing machine directing it to the passage to the cylinder during the inspiration half-cycle, collapsing the bellows so that its bottom is forced upward. A novel pneumatically operated switching arrangement powered by pressure from the breathing machine operates the electromagnetic valve for initiating this half-cycle.

Magnetically operated switch means adjustably mounted on the outside of the cylinder end the first half-cycle and initiate the second or expiration half-cycle by reversing the electromagnetic valve. Permanent magnets on the bellows bottom actuate this switch means and the change in half-cycle is communicated to the breathing machine by a rise in pressure in the conduit connection with the breathing machine.

During the expiration half-cycle valve changes initiated by the electromagnetic valve, allow the air to exhaust from the cylinder and be drawn into the bellows by the now falling bellows bottom.

The end of the expiration half-cycle is triggered by the breathing machine automatic time control or patient induced minus pressure which is communicated through the volumetric control device to the machine.

At the next inspiration half-cycle when the bellows bottom rises again because of gas introduced into the cylinder, gas from the bellows is forced to the patient.

A shut-off valve is provided for cutting off patient signals through the device to the machine if desired. Another shut-off valve may be closed to supply room air to the patient instead of the gas mixture from the breathing machine.

The principal object of the invention is to provide novel economically constructed and portable means for a volumetric control for intermittent positive pressure breathing machines.

Another important object is to provide means in the volumetric control for cutting off patient signals to the breathing machine so that the breathing is entirely automatically controlled.

A further object is to provide means associated with a breathing machine for supplying room air to the patient without using bulky cylinders of compressed air or a noisy compressor.

A still further object is to provide a pneumatically operated electric switching arrangement for supplying a short pulse of electric current to a known type of electromagnetically operated valve.

Other objects and advantages will appear from the following description in conjunction with the appended drawings, in which:

BRIEF DESCRIPTION OF THE DRAWINGS

FIG. 4 is a diagrammatical right side elevational view of the device of FIG. 1 on a reduced scale;

FIG. 5 is a diagrammatical enlarged view of the pneumatically operated switching device shown in FIG. 1;

FIG. 6 is a wiring diagram of the electrical portions of the device of FIG. 1;

FIG. 7 is a diagrammatic sectional view of the electromagnetically operated valve of FIG. 1;

FIG. 8 is a diagrammatic side elevational view of a magnet operated switch of FIG. 1;

FIG. 9 is a plan view of the collar portion of FIG. 1; and

FIG. 10 is a diagrammatic sectional view of the pressure operated pneumatic valve of FIG. 1.

DESCRIPTION OF THE PREFERRED EMBODIMENT

Figure 1:
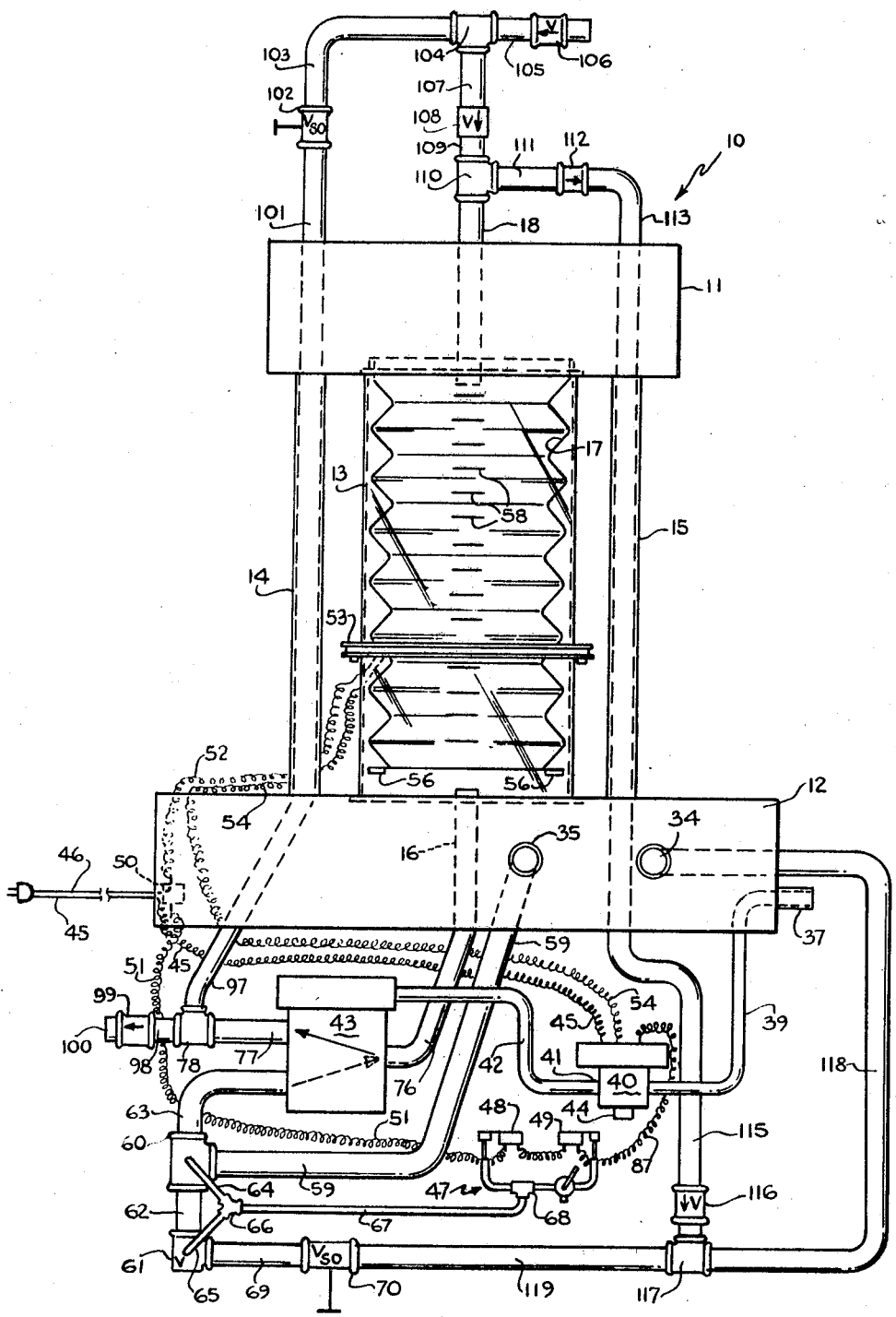
FIG. 1 is a diagrammatical front elevational view of a volumetric control device according to the invention.

In FIG. 1 of the drawings the volumetric control device 10 is shown as having an upper housing 11 and a lower housing 12 connected by a transparent hollow cylinder or tube 13, preferably of "Plexiglas." Two tubular support pillars, the cylinder to bellows tube 14 and the bellows to patient tube 15, together with cylinder 13 space the upper housing 11 with respect to the lower housing 12.

The cylinder 13 is sealed closed at top and bottom in conventional manner except that a tube 16 in the lower housing is sealed in communication with the interior of the cylinder. At the top of cylinder 13 a rubber bellows 17 is suspended and both ends of the bellows are sealed closed except for a tube 18 in the upper housing in sealed communication with the interior of bellows 17. Except through tubes 16 and 18 there is no communication between the interior of cylinder 13 and the interior of bellows 17.

The tubes, valves, pipes, wires and switches contained in the upper and lower housings 11 and 12 are shown diagrammatically above and below the respective housings in FIG. 1.

Figure 2:
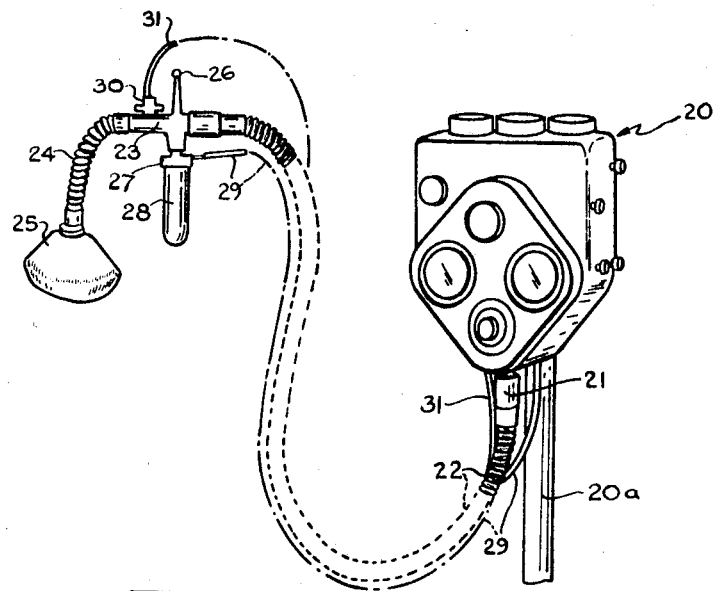
FIG. 2 is a diagrammatical perspective view of an intermittent positive pressure breathing machine with which the device of FIG. 1 is used.

The volume control device 10 is used in combination with an I.P.P.B., intermittent positive pressure breathing, machine 20 shown in FIG. 2. The I.P.P.B machine 20, shown supported on a standard 20a, has a complicated arrangement of valves, gauges, and controls not necessary to describe for an understanding of the volume control device 10. The I.P.P.B. machine is conventionally connected to a source of oxygen under pressure, not shown, and has a flexible tube 22 connecting the output 21 of the machine 20, through an adapter 23, to another shorter flexible tube 24 leading to a face mask 25, or other patient connecting device. Either a mouthpiece or a tracheostomy connection device for connection directly to the patient's cannula when a tracheostomy has been performed, may be used instead of the face mask as a patient connection means.

The adapter 23 has a support post 26, by which it may be supported close to the patient, and a connection 27 for a nebulizer 28, which supplies medication to the gas mixture flowing from the I.P.P.B. machine to the patient. Alternatively a humidifier, connected to tube 22 near the machine and not shown, may be used alone or in conjunction with nebulizer 28. A smaller flexible plastic tube 29 brings gas for operating the nebulizer from the machine 20.

An exhaust outlet valve 30 is provided at the adapter 23 close to the patient for the escape of the patient's exhaled breath. Another small plastic tube 31 connects valve 30 to machine 20 for closing the exhalation valve when the machine 20 is supplying the patient with gas during inspiration.

The I.P.P.B. machine 20 operates on the pressure of the oxygen supply and supplies air mixed with oxygen at a reduced pressure to the patient through the tube 22, adapter 23, tube 24, and face mask 25. The machine is pressure-sensitive, that is, it stops supplying the gas mixture when resistance at the patient causes a pressure increase to a cut-off pressure which may be chosen by regulation of the controls at the I.P.P.B. machine. There is also an automatic cycle control which automatically times each inspiration and expiration and this timing is regulatable at the machine.

After the inspiration half of the cycle ends, either by the regulated pressure limit being reached or by the expiration of the half cycle automatically regulated time which has been chosen, the patient exhales through the exhaust outlet valve 30.

This expiration half-cycle ends at the end of the time period chosen for the automatic cycle control or by a minus pressure signal from patient to machine, whichever comes first. If the patient starts to inhale before the automatic timer initiates the next half-cycle the minus pressure created in tube 24 by the patient is communicated through tube 22 to machine 20 causing the machine to start the next cycle.

The better I.P.P.B. machines provide for a variable flow when there are restrictions in the patient's passages so that the inspiration is not cut off too quickly by a rise in pressure. Even when the automatic cycling control is used, there is a patient over-ride for both inspiration and expiration half-cycles through patient induced low pressure for starting inspiration and patient induced high pressure for ending the inspiration half-cycle.

Figure 3:
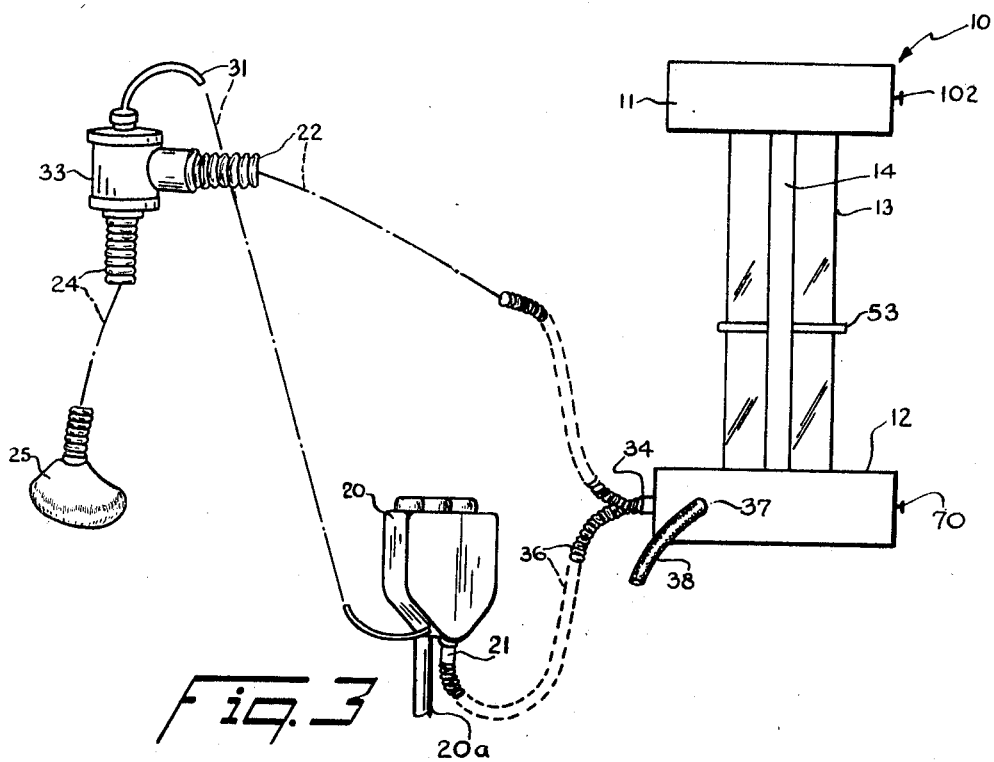
FIG. 3 is a diagrammatical perspective view of the device of FIG. 1 connected to the machine of FIG. 2.

When the volume control device 10 is used with an I.P.P.B. machine, it is connected as shown in FIG. 3. The face mask 25 is connected by tube 24 to an adapter 33 which contains an exhaust valve 30, although it cannot be seen in FIG. 3. Tube 31 connects exhaust valve 30 directly to the I.P.P.B. machine 20 for opening valve 30 during the expiration half-cycle and closing it during the inspiration half-cycle.

Tube 22, however, connects the adapter 33 to device 10 at a patient attachment outlet 34 at the front of the lower housing 12. Device 10, in turn, is connected from a machine attachment inlet 35, also at the front of the lower housing (FIG. 1) to the I.P.P.B. machine 20 output 21 by the tube 36. At the right of lower housing 12 a high pressure inlet 37 is connected by tube 38 to a source of gas pressure, usually oxygen, at machine 20 or elsewhere.

If medication or humidification is desired, an adapter similar to adapter 23 with a connection for a nebulizer 28 may be used instead of adapter 33, or a humidifier may be connected through tube 22.

Referring again to FIG. 1, high pressure inlet 37 is connected by a tube 39 to a normally closed electrically operated, high pressure, pneumatic valve 40. The operating outlet 41 of valve 40 is connected by a tube 42 to a pneumatically operated 3-way valve 43. Valve 40 also has an exhaust port indicated at 44.

At the left of lower housing 12 electric wires 45 and 46, adapted to be connected to a source of alternating current, enter the housing. Wire 45, in the housing leads directly to valve 40. Wire 46 is connected through a rectifier 50, or other device to convert the usually more available A.C. to D.C., to a wire 51 which leads to the pneumatically operated switch device 47 which includes a normally open switch 48 and a normally closed switch 49. "Open" and "closed" are here used in the sense of "open" or "closed" contacts, switch 48 being normally "off" and switch 49 normally "on."

Wire 46 is also connected through rectifier 50, by a wire 52 to switches on a collar 53 slideably mounted on the cylinder 13. Another wire 54 leads from the collar switches to the electrically operated valve 40.

Collar 53 is preferably made in two semi-circular halves bolted together as shown in FIG. 9, and carries a pair of dry-reed magnetically operated switches 55—55 on either side of the cylinder 13. Mounted on either side of the closed bottom of the bellows 17 are two permanent magnets 56 for operating the switches 55—55 as shown in FIG. 1. Switches 55—55 are wired in parallel between wires 52 and 54 as shown in FIG. 9.

A switch 55 is shown in FIG. 8. This commercially available switch comprises a glass envelope into which project two flat and thin metal contacts which are adapted to be drawn together into electrical contact when a magnet approaches.

Also shown in FIG. 9, mounted on collar 52 are three leaf spring friction members 57, preferably made of "nylon" or other non-abrasive material. Collar 52 may be manually slid up or down on cylinder 13 and thereafter is held in position by the spring members 57 bearing against the cylinder. A vertically extending scale 58 calculated in units of volume is marked on the side of cylinder 13 to aid in the locating of the desired position for collar 52.

Referring again to FIG. 1, the machine attachment inlet 35 is connected by a pipe or tube 59 to a pressure entrance T 60. T 60 is connected to a pressure operated two-way valve 61 by a pipe 62 and to an entrance to valve 43 by a pipe 63.

The T 60 and valve 61 each have a small diameter bleeder tube connected thereto. Tube 64 is connected to the interior of the T 60 and tube 65 leads to the operating mechanism of valve 61. Tubes 64 and 65 each lead to a Y 66 which is connected through a small tube 67 to a T 68 at the pneumatically operated switch device 47. The other opening of the valve 61 is connected by a pipe 69 to a manually operated shut-off valve 70.

Referring now to FIG. 10, the valve 61 is shown as comprising a normally open valve with communication between pipes 62 and 69. For clarity in the description the ends of this passage in valve 61, which, it will be understood, are provided with conventional means for connection to the respective pipes, have been designated 62' and 69'. A nipple or tube 71 is provided at the top of valve 61 for connection to the small tube 65. The outer end of tube 71 is adapted for connection with tube 65 and has been designated 65'. For convenience in illustration in FIG. 1 the tube 65 is shown entering valve 61 at the side instead of the top. Tube 71 projects down into the valve to a point adjacent the seat 72 in the passage between openings 62' and 69'. At the lower end of the nipple a flat head 73 is provided to which is secured a flexible and expandable diaphragm 74 normally stretched flat against the head 73 as shown in solid line. When pressure is applied to the passage through the nipple 71 the diaphragm 74 is blown up or inflated like a balloon, as shown in dotted line, to seal communication between tubes 62 and 69 at the seat 72. When pressure appears at the T 60, therefore, it is communicated through tube 64, Y 66, tube 65 and tube 71 to blow up the balloon 74 and seal off the pipe 69. A spring 75 has been provided to this otherwise conventional valve which spring is seated near the pipe 69 for biasing the diaphragm 74 towards its open position. This insures a quick return to the open position of valve 61 when pressure returns to normal at the T 60.

Referring again to FIG. 1, the three-way valve 43 is connected to the tube 16, which is in communication with the interior of cylinder 13, by a pipe 76 and is connected by a pipe 77 to a T 78. Valve 43 in its normal and biased position provides communication between pipes 76 and 77 as indicated by the full line arrow in FIG. 1. When the valve is operated, however, this communication is cut off and pipe 76 is brought into communication with pipe 63 and the pressure entrance T 60 as indicated by the dotted arrow in FIG. 1. Since this is a known type of pneumatically operated valve no further detail of the construction of valve 43 need be given.

When pressure first appears at T 60, valve 61 closes, as described above, and pressure is also transmitted through the bleeder tube 64 to Y 66 and thence through tube 67 to the T 68. Referring now to FIG. 5, this pressure is transmitted by T 68 to tubes 80 and 81 in the novel switch arrangement 47.

Tubes 80 and 81 terminate in nipples 82 which have flat heads to which are attached flexible and expandable diaphragms 83 so that they are blown up like balloons when gas flows through the nipples 82.

The nipples 82 are respectively supported near the switches 48 and 49 so that the balloon valve at the end of tube 80 operates the operating arm 84 of switch 48 and the balloon valve at the end of tube 81 operates the operating arm 85 of switch 49. The operating arms are biased toward their normal positions and represented as each having a pivot 86 so that when the balloon at switch 48 is inflated the electrical contacts of the switch are operated to make contact and when the balloon at switch 49 is inflated its normally closed contacts are moved apart to the "off" position of the switch.

Switches 48 and 49 are in series, as shown, a contact of switch 48 being connected to the wire 51 from source of electric power and a contact of switch 49 being connected by a wire 87 leading to electrically operated valve 40.

There is a time delay device, however, in the tube 81 comprising a manually adjustable valve 88 in the tube 81 between the T 68 and nipple 82. This valve is a three-way valve, as shown, adapted to partially connect the line 81 to an exhaust port 89 while partially throttling down the flow of gas through the tube.

When increased pressure reaches tube 80, therefore, the balloon at the end of this tube is inflated immediately and switch 48 is turned "on." Since switch 49 is normally "on," current flows from wire 51 through the two switches and wire 87 to the electrically controlled valve 40.

Due to the time delay of valve 88 the balloon at the end of tube 81 is not inflated until an appreciable time later, the time interval being regulated by adjusting valve 88. When the balloon at the end of tube 81 is inflated, switch 49 is operated to the "off" position and current no longer flows to the valve 40. This results in a short pulse of direct current being applied to valve 40.

Valve 40 is adapted to open and stay open until another pulse of current reaches the electromagnets of the valve. When valve 40 opens, gas under pressure from the high pressure connection 37 flows from the pipe 39 through pipe 42 to operate the valve 43. When this valve is operated gas under pressure flows from pipe 63 to pipe 76, as indicated by the dotted arrow in FIG. 1, and through the entrance 16 into the interior of the cylinder 13.

With the rise in pressure in the interior of the closed cylinder 13, the bellows 17 are caused to collapse, since the bellows are closed except for the passage 18 at the top. Since the bellows are secured to the upper housing 11 at the top while the bottom hangs free, the bottom of the bellows rises, carrying the magnets 56—56 with it.

When either magnet 56 approaches its respective switch 55, the switch is closed thereby. The two switches being in parallel assures prompt electrical contact if either the bellows bottom or collar 53 isn't exactly level. When either switch 55 closes, wire 52 from the rectifier 50, is connected to the wire 54 which is connected to valve 40.

Referring now to FIG. 7, the valve 40 is a commercially available "Skinner Magnelatch" valve operating on a momentary pulse of current. Communication between its connection with pipe 39 and its outlet 41 is normally closed by a permanent magnet plunger 90 being biased by spring 90a, the outlet 41 being in communication with the port 44.

When a pulse of current from the switch arrangement 47 through wire 87, reaches electromagnets 91 and 92 both electromagnets are energized. The coil of electromagnet 91 is wound around the upper portion of the plunger 90 and around the plunger-stop 93, containing the passage to the port 44.

The coil of electromagnet 92 has two windings, however, and the pulse of current from switch 47 is connected to the winding which sets up lines of electromagnetic flux which augment, or flow in the same direction as, the electromagnetic flux from electromagnet 91 through the saddle plate 94 and the sole plate 95.

The core of electromagnet 92 has a layer or portion 96 at its middle which is a permanent magnet the polarity of which can be reversed. Once energized as described above it retains its polarity until the polarity of electromagnet 92 is reversed by another pulse of current.

When one of the switches 55 is operated by the approach of a magnet 56 to close, wire 52 is connected to wire 54 and the other winding of electromagnet 92 is energized and the polarity of electromagnet 92 is reversed.

Electromagnets 91 and 92 are now "out of phase" and the flows of electromagnetic flux are in opposite directions causing the output of the permanent magnet 90 to shunt across the plunger magnetic circuit. This causes the plunger 90 to move upward against the stop 93 sealing the port 44 and opening communication between inlet 39 and outlet 41. The permanent magnet 96, now changed in polarity, retains its polarity until the polarity is again changed by another pulse of current through switches 48 and 49.

Referring again to FIG. 1, when the valve 43 is operated by the rising bellows to return to its normal unoperated position, pipe 76 is again connected to pipe 77 and the bellows bottom falls by gravity and gas is expelled from the interior of the cylinder 13. The expelled gas is conducted from the T 78 by a pipe 97 which is connected to the cylinder to bellows tube 14.

The third opening in T 78 is connected by a pipe 98 to a one-way pressure relief valve 99 which has an outlet 100 to atmosphere. Normally this valve remains closed so that gas expelled by the falling bellows is conducted through tube 14 to the upper housing.

In the upper housing, tube 14 is connected to a pipe 101 leading through a normally open, manually operated, shut off valve 102, at the rear of the upper housing, to another pipe 103 terminating at T 104. A second passage in T 104 is connected by a pipe 105 to a leaf valve or one-way check valve 106 arranged to admit room air to the system as indicated by the arrow on the valve in FIG. 1.

The third passage from T 104 is connected by a pipe 107, through another one-way leaf valve 108, to a pipe 109 terminating in another T 110. A second passage in T 110 is connected to the tube 18 leading to the interior of bellows 17, and a third passage is connected by a pipe 111 to a one-way leaf valve 112, arranged to open only at a pressure slightly more than atmospheric. Valve 112 is connected by a pipe 113 to the bellows to patient tube 15 leading to the lower housing. When gas is expelled from cylinder 13 by the falling bellows it is thus conducted through tube 18 and drawn into the interior of the bellows, valve 112 being adjusted not to open at this pressure.

When gas is again admitted under pressure to cylinder 13, bellows 17 is compressed and the gas in the bellows is expelled through valve 112 to the lower housing, valve 108 preventing return of the gas toward the T 104.

The bellows to patient tube 15 is connected to a pipe 115 in the lower housing leading through another one-way leaf valve 116 to another T 117. One passage in T 117 is connected by a pipe 118 to the patient outlet 34, which is connected by the tube 22 (FIG. 3) to the face mask or other patient connecting means. Another passage in T 17 is connected by a pipe 119 to the normally open shut-off valve 70.

When gas is first expelled from bellows 17 by gas being forced by the I.P.P.B. machine into cylinder 13, the gas entrance T 60 has been under pressure and, therefore, the pressure operated valve 61 is closed. Gas from the bellows is, therefore, conducted to the patient and no gas flows through pipe 119. At the conclusion of the inspiration half-cycle, however, when pressure from the I.P.P.B. machine ceases, valve 65 opens by gas bleeding from the valve balloon through tubes 65 and 64 and any negative pressure in the flexible tube 22 is transmitted back to the I.P.P.B. machine through pipe 118, T 117, pipes 119 and 69, the now open valve 61, and the flexible tube 36 leading to the I.P.P.B. machine.

When pressure is bled from valve 61, pressure also bleeds through tube 67 from the switch arrangement 47 and switches 48 and 49 return to their normal condition.

It will be noted that the one-way valves 112 and 116 perform the same function, to prevent reverse flow in the tube 15. Valve 112 is located near T 110 to prevent passage of gas in pipe 111 while gas is being sucked into the bellows. Valve 116 is located near T 117 to prevent pressure back-up into the relatively long tube 15 at the end of the inspiration half-cycle. Valve 116 has sufficient bias toward closed to prevent minus pressure signals from the patient being transmited other than toward the entrance T 60.

In operation, during the inspiration half-cycle, which may be triggered by patient effort or by the automatic cycling of the I.P.P.B. machine, gas from the I.P.P.B. machine flows from the machine inlet connection 35 to T 60, through valve 43 and passage 16 to the interior of cylinder 13. Valve 43 is triggered by the pressure at the switch arrangement 47 which operates as described above to open valve 40 so that high-pressure is admitted through valve 40 to operate valve 43. While gas flows into cylinder 13, the collapsing of bellows 17 expels gas from passage 18 through T 110, valve 112, tube 15, valve 116, tube 118, and out of the patient outlet 34 to the patient.

The inspiration half-cycle ends normally when a magnet 56 at the bellows bottom closes a switch 55 on the collar 53 to trigger valve 40 so that valve 43 returns to normal. Collar 53 is adjustable to control the length of travel of the bellows bottom and hence the volume of gas expelled from the bellows to the patient. Should the collar be set too high the half-cycle could be ended by pressure build up in the I.P.P.B. machine communicated from the patient or by the automatic cycling of the machine.

The collar 53, being adjustable, controls the volume of gas delivered to the patient when it is properly adjusted. The rise and fall of the bellows gives a visual indication of the cycling of the machine as well as the volume of gas delivered. Because of the resiliency of the pneumatically operated bellows, there is provided a more variable rate of flow, automatically compensating for minor changes in patient compliance or for an obstruction or restriction. If there is a major change in any of the above conditions the bellows gives visual indication thereof.

The expiration half-cycle, when it is triggered by the switches on collar 53, is signalled to the I.P.P.B. machine by increased pressure due to valve 43 closing and is signalled to the exhalation valve 30 by the I.P.P.B. machine through the tube 31. While the patient exhales through valve 30, gas in the cylinder 13 is expelled by the falling bellows and flows through valve 43, T 78, tube 14, pipes 101 and 103, T 104, pipes 107 and 109, T 110, and passage 18 into the interior of the bellows which draws the gas therein.

The end of the expiration half-cycle and the start of the next inspiration half-cycle is triggered by the autocycling of the I.P.P.B. machine or the inspirational effort of the patient signalled through tube 22, outlet 34, pipes 118 and 119, valve 61, T 60, pipe 59 and the machine to device tube 36.

It will be noted that device 10 can deliver any desired mixture of air and oxygen up to 100% oxygen which the I.P.P.B. machine is capable of delivering. Humidity and/or medication nebulizers may be used with the device 10 and the I.P.P.B. machine's sensitivity to negative pressure and capability of autocycling are unaffected.

Occasionally, a patient may be required to have his breathing cycled automatically by the I.P.P.B. machine without the pressure or inspiration portion of the cycle being possibly initiated by an inspirational effort on the part of the patient. Communication between patient and I.P.P.B. machine at this point in the cycle may be cut off, in such cases, by closing the shut-off valve 70. This option is not available during treatment by the I.P.P.B. machine alone.

Another option is provided by the shut-off valve 102. When it is desired that the patient have assistance in breathing but with air alone, without added admixture with oxygen, shut-off valve 102 is closed. All communication between bellows and cylinder is thus cut off. At the end of the inspiration cycle, when a switch 55 on collar 53 is operated to shut valve 40 and return valve 43 to its normal condition connecting pipes 76 and 77, gas is forced out of cylinder 13 by the falling bellows. Since this expelled gas cannot flow past the closed valve 102, the gas is expelled to atmosphere through the valve 99, this valve being adapted to open at a pressure caused by the falling bellows. When valve 102 is open suction in tube 14 caused by the expanding bellows prevents pressure at valve 99 reaching the amount necessary to open the valve.

Since the falling bellows cannot draw gas through the closed shut-off valve 102, and the passage to tube 15 is closed by valve 112, suction of the bellows lowers pressure in T 104 sufficiently to open the valve 106 to draw room air into the bellows for expulsion at the next half cycle through tube 15 to the patient.

This second option for supplying room air only to the patient can be accomplished by the I.P.P.B. machine alone but only when the pressure source is bottled air under pressure or where a compressor is used. Oxygen under pressure is supplied built-in in most modern hospitals. This eliminates the need for transporting bulky cylinders. Moreover, compressors are also bulky and noisy as well. It will therefore be apparent that the second option provided in the device 10 has advantages in its means for supplying room air over the means used for the same purpose with the I.P.P.B. machine alone.

As will be apparent to those familiar with the art, the invention may be embodied in other specific forms without departing from the spirit or essential characteristics thereof. The embodiment disclosed therefore is to be considered in all respects as illustrative, rather than restrictive, the scope of the invention being indicated by the appended claims.

What is claimed is:

1. A volumetric control device for use with an intermittent positive pressure breathing machine, the machine supplying gas under pressure from a machine outlet for a patient on the inspiration portion of each cycle and having an exhalation exhaust valve automatically opened by the machine during an expiration portion of the cycle, the expiration portion being initiatable by patient induced pressure producing resistance and the inspiration portion being initiatable by patient induced minus pressure, the machine having automatic timing controls for alternative cycle portion initiation, patient connection means being connected by conduit means to the exhalation valve; the device comprising a transparent hollow cylinder, a rubber bellows suspended by its top in the cylinder, the bellows and the cylinder each being sealed at top and bottom and each having a separate passage in sealed communication to the interior thereof, a source of electric current, a collar secured on the cylinder and adjustable vertically thereon, normally open magnetically operated switch means mounted on the collar, magnet means mounted on the bellows bottom for closing the collar switch means, a three-way valve, conduit means connecting the three-way valve to the cylinder passage, conduit means connecting the three-way valve to the bellows passage, conduit means connecting the three-way valve to the machine outlet, electrically operated means for operating the three-way valve to connect the cylinder passage to the bellows passage during expiration and to connect the cylinder passage instead to the machine outlet during inspiration, a T adjacent the bellows passage in the three-way valve to bellows conduit, conduit means connecting the T to the patient connection means, a first one-way valve between the T and the three-way valve for preventing flow of gas from the bellows to the three-way valve, a second one-way valve between the T and the patient connection means for preventing flow of gas from the patient to the bellows, a pneumatically operated switch arrangement, conduit means connecting the switch arrangement to the conduit connection between the three-way valve and the machine outlet whereby the switch arrangement is operated when the machine delivers gas under pressure to the device, the switch arrangement connecting the source of electricity to the means for operating the three-way valve so as to connect the machine outlet to the cylinder passage when gas under pressure is delivered by the machine, the collar mounted switch means connecting the source of electricity to the means for operating the three-way valve so as to connect the bellows and cylinder passages, whereby gas under pressure is delivered to the cylinder thereby compressing the bellows during inspiration, gas from the bellows being forced under pressure to the patient, and when the magnet means on the bellows bottom reaches the height of the switch means on the collar the three-way valve is reversed allowing the bellows to expand to force gas from the cylinder to the bellows, while increased pressure in the machine to three-way valve conduit concludes the inspiration portion of the cycle.

2. The volumetric control device defined in claim 1 characterized by having the bellows to patient conduit cross-connected at the device to the machine to three-way valve conduit, and by having a pressure operated valve in this cross-connection operated by conduit means connecting the pressure operated valve to the conduit from machine to three-way valve whereby pressure of gas from the machine closes the cross-connection during inspiration and the valve opens during expiration allowing patient induced minus pressure to be communicated through the device to the machine for initiating the inspiration portion of the cycle.

3. The volumetric control device defined in claim 2 characterized by having a shut-off valve in the cross-connection between the pressure operated valve and the bellows to patient conduit for selectively shutting off the communication of patient induced minus pressure from being communicated to the machine.

4. The volumetric control device defined in claim 1 characterized by having a shut-off valve in the three-way valve to bellows conduit between the three-way valve and the T in said last-named conduit, there being a pressure sensitive valve leading to atmosphere in said last-named conduit between the shut-off valve and the three-way valve for exhausting gas from the cylinder during expiration, and an open ended one-way valve connected to said last-named conduit between the shut-off valve and the T for admitting room air to the bellows during expiration, whereby room air may selectively be supplied to the patient during inspiration.

5. The volumetric control device defined in claim 1 characterized by the electrically operated means for operating the three-way valve being an electromagnetically operated valve having a coil so wound and wired that current from the switch means on the collar closes the last-named valve and current from the pneumatically operated switch arrangement opens the last-named valve, there being a constant source of gas under pressure connected to the device, conduit means connecting the last-named source to the last-named valve and conduit means connecting the last-named valve to the three-way valve, the three-way valve being pneumatically operated, the electromagnetically operated valve being adapted to admit gas under pressure to the three-way valve when open and when closed to cut off gas under pressure from the three-way valve and to exhaust the conduit from the electro-magnetically operated valve to the three-way valve to atmosphere.

6. The volumetric control device defined in claim 5 wherein the electromagnetically operated valve is adapted to be operated by a short pulse of current, and the pneumatically operated switch arrangement comprises a pair of switches wired in series, each switch of the pair having an operating lever and one being normally open and the other normally closed, the conduit from the conduit connection between the three-way valve and the machine outlet to the arrangement terminating in a T, each arm of the arrangement T having a conduit terminating in a rubber balloon supported adjacent a respective switch operating lever of the pair so that when a balloon is inflated its adjacent lever is operated, the conduit leading to the balloon adjacent the normally closed switch having an adjustable valve therein adapted to partially connect the last-named conduit to atmosphere, whereby the balloon adjacent the lever of the normally open switch of the pair is first inflated to close its switch allowing current to pass through the pair and subsequently the balloon adjacent the lever adjacent the normally closed switch is inflated to open its switch to cut the current through the series wired switches to a pulse.

References Cited

UNITED STATES PATENTS

| | | | |
|---|---|---|---|
| 2,867,210 | 1/1959 | Bennett | 128—145.8 |
| 3,156,238 | 11/1964 | Bird et al. | 128—188 X |
| 3,265,061 | 8/1966 | Gage et al. | 128—145.8 |

ANTON O. OECHSLE, Primary Examiner

T. BROWN, Assistant Examiner